United States Patent
Holland et al.

(10) Patent No.: US 8,144,691 B2
(45) Date of Patent: Mar. 27, 2012

(54) QUERY-BASED CALL ROUTING MECHANISM FOR MULTINODE COOPERATIVE TELECOMMUNICATION NETWORK

(75) Inventors: Robert Victor Holland, Madison, AL (US); John Timothy Pearson, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 1487 days.

(21) Appl. No.: 10/619,327

(22) Filed: Jul. 14, 2003

(65) Prior Publication Data

US 2005/0013286 A1    Jan. 20, 2005

(51) Int. Cl.
*H04L 12/28* (2006.01)
*H04M 7/00* (2006.01)
*H04L 12/66* (2006.01)

(52) U.S. Cl. ......... 370/352; 370/400; 379/225; 379/232
(58) Field of Classification Search .................. 370/278, 370/351, 352, 400; 379/225, 232
See application file for complete search history.

(56) References Cited

U.S. PATENT DOCUMENTS

| | | | | |
|---|---|---|---|---|
| 6,647,264 B1 * | 11/2003 | Sasamoto | ...................... | 455/445 |
| 6,680,942 B2 * | 1/2004 | Mead et al. | .................... | 370/392 |
| 6,721,318 B1 * | 4/2004 | Cai et al. | ........................ | 370/390 |
| 6,725,045 B2 * | 4/2004 | Oren et al. | ..................... | 455/445 |
| 6,741,696 B1 * | 5/2004 | Moriyama | ................ | 379/265.01 |
| 2001/0003092 A1 * | 6/2001 | Sjodin | ............................ | 455/433 |
| 2001/0003522 A1 * | 6/2001 | Masuhiro | ...................... | 370/237 |
| 2003/0138085 A1 * | 7/2003 | Forman et al. | ........... | 379/142.01 |

* cited by examiner

*Primary Examiner* — Marcus R Smith
(74) *Attorney, Agent, or Firm* — Allen, Dyer, Doppelt, Milbrath & Gilchrist, P.A.

(57) ABSTRACT

A query message-based call routing mechanism for a limited access cooperative telecommunication network initially determines whether the called party is commonly located at the same node as the calling party. If not, the calling party node broadcasts a query message to all other nodes in the network to locate the called party. Only the node having local knowledge of the called extension will reply to the query message. Once the node sourcing the query message has received this reply message, it will place a call to the node servicing the called extension.

2 Claims, 1 Drawing Sheet

QUERY-BASED CALL ROUTING MECHANISM FOR MULTINODE COOPERATIVE TELECOMMUNICATION NETWORK

FIELD OF THE INVENTION

The present invention relates in general to communication systems and subsystems therefor, and is particularly directed to a new and improved call routing methodology that operates dynamically to locate remote extensions of a multinode cooperative telecommunication network.

BACKGROUND OF THE INVENTION

Cooperative telephony systems provide users thereof with the ability to communicate with one another over a restricted access network. Non-limiting examples include private branch exchanges installed in different offices of commercial, industrial and governmental enterprises. In such systems, a calling party needs only to dial a limited digit identification code or extension (e.g., three or four digits) in order to be connected with a called physical resource (phone) in the same or another office. Because members of such networks may move among various (branch) locations, it is customary practice to employ a unified dialing plan or table containing information regarding each physical resource, including its location. This serves to equip each node of the network with the ability to locate a particular extension when routing a call.

Unfortunately a unified dialing plan has a number of drawbacks, particularly where resource node membership can be expected to change. Since each node has a copy of the plan, any change to a node must be replicated at every other node or made to a master. Changes in the dialing plan may also lead to out-of-date routing information, resulting in mis-routed calls, which leads to user frustration while the information is being updated. Number portability is another problem that conventional implementations have not addressed. When moving an extension between nodes, system support has been cumbersome, since changes must be propagated to routing tables in other nodes. Moreover, having multiple copies of routing information creates a greater chance for errors. It has been found that moving an extension from one node to another is likely to cause routing problems, since each node has invalid data until its location information is updated.

SUMMARY OF THE INVENTION

In accordance with the present invention, these and other problems associated with the routing of calls within a limited access cooperative telecommunication network are effectively obviated by a new and improved call routing methodology, that initially determines whether the called party is commonly located with the calling party (e.g., within the same private branch exchange). If not, the calling party node broadcasts a query message to all other nodes in the network to locate the called party. Only the node having local knowledge of the called extension will reply to the query message. Once the node sourcing the query message has received this reply message, it will place a call to the node servicing the called extension.

DETAILED DESCRIPTION

Figure 1:
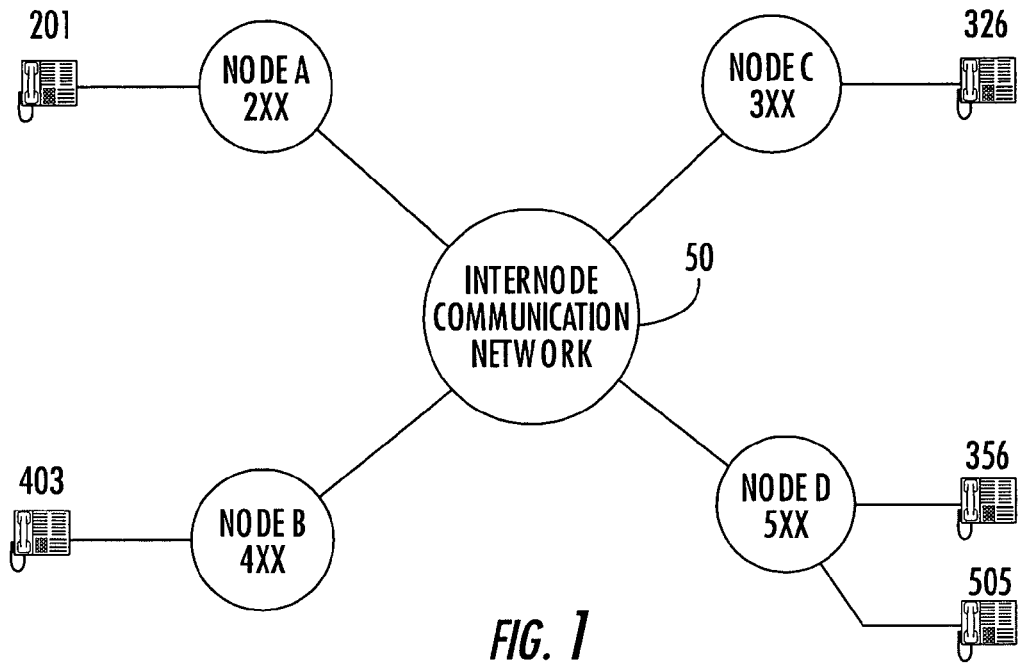
FIG. 1 diagrammatically illustrates a reduced complexity example of a multinode cooperative telecommunication network that employs the extension routing methodology of the present invention.

Before describing in detail the new and improved call routing mechanism in accordance with the present invention, it should be observed that the invention resides primarily in what is effectively an information processing routine embedded within the call routing software resident in the various nodes of a cooperative telecommunication network. In order not to obscure the disclosure with details which will be readily apparent to those skilled in the art having the benefit of the description to follow, the invention has been illustrated in the drawings in readily understandable block diagram format, which show only those specific details that are pertinent to the present invention, in a convenient functional grouping, and associated flow chart format, whereby the present invention may be readily understood.

Attention is now directed to FIG. 1, which diagrammatically illustrates a reduced complexity example of a multinode cooperative telecommunication network, in which the extension routing methodology of the present invention is employed. As shown therein the network contains four switchboard nodes A, B, C and D that communicate with one another by way of an internode communication network 50, such as but not limited to a frame relay (FR) network, an internet protocol (IP) network, a dedicated T1 communication link, and the like.

For purposes of the present description, each of the switchboard nodes A-D may comprise a private branch exchange (PBX) platform that services an associated set of telephone units, each of which is identified by a three-digit extension. To this end, node A is shown as servicing extensions 2XX, node B services extensions 4XX, node C services extensions 3XX, and node D services extensions 5XX. Each switchboard node has knowledge of each local account (its associated extensions), but has no knowledge of remote accounts, namely what extensions are assigned to other nodes.

Also shown coupled with each node is a respective local user resource (telephone unit), the identification of which is defined by a respective three-digit extension. In particular, node A is coupled with a user extension 201, node B is coupled with a user extension 403, node C is coupled with a user extension 326 and node D is coupled with a user extension 505. In addition, node D is coupled to service an extension 356 that falls within the set of extensions 3XX that are normally associated with node C. Its association with node D is due to the fact that extension 356 has been moved from node C (which customarily services extensions 3XX) to node D (which customarily services extensions 5XX).

When a call is sourced from an extension serviced by the respective switchboard node to which it is connected, the switchboard examines its list of known accounts, namely, the extensions of all the accounts that are assigned to that switchboard node. If the called extension is found to be local to that node, the switchboard connects the incoming call to the target account. However, if the target account is not local to the switchboard node, the switchboard must determine which remote node contains the target account. In accordance with the present invention this determination is accomplished by broadcasting a search message from the call-sourcing node to all other nodes that are part of the cooperative network. Since each node has a list of all of its local accounts, if the account is present somewhere in the network, one of the nodes will be able to reply that it is servicing that extension. The sourcing node is thereby informed of which node has the called extension and is able to set up the call to the appropriate node servicing the called extension.

Figure 2:
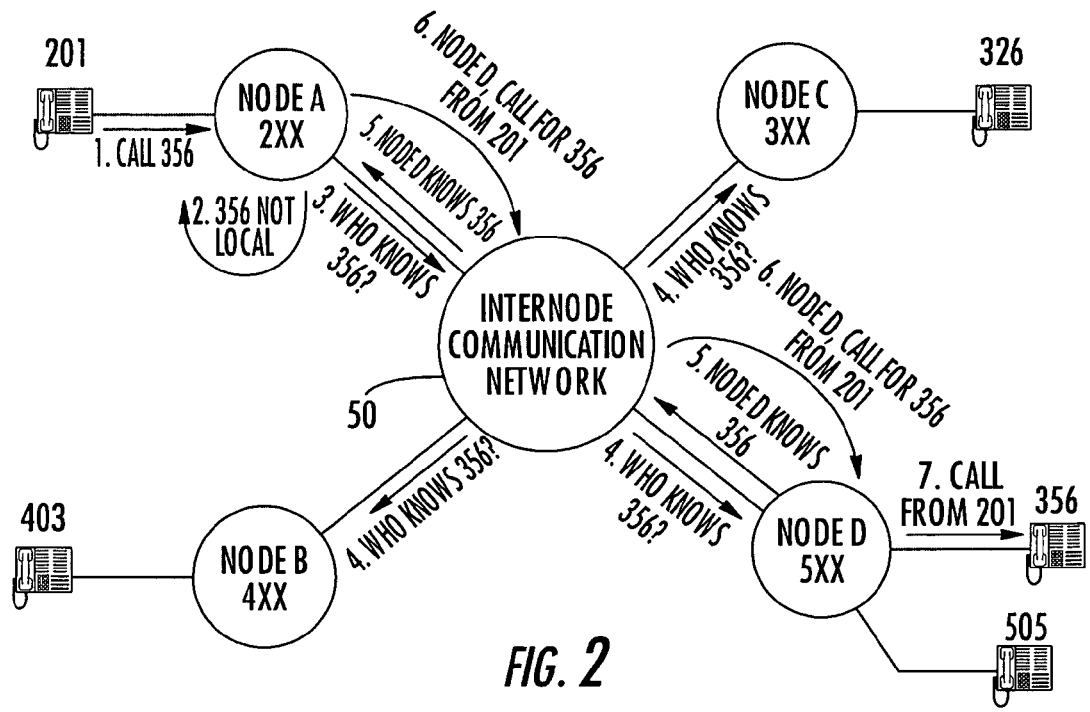
FIG. 2 shows the cooperative node network of FIG. 1 with a superimposed sequence diagram for the example of a user at one node attempting to call an extension at another node.

To illustrate the above described methodology of the invention attention is directed to FIG. 2, in which the cooperative node network of FIG. 1 has been augmented with a superimposed sequence diagram for the example of a user at node A attempting to call an extension that is not at node A, nor is it at the node whose prefix digit used by that node. In the present example, the user at extension 201 is attempting to call the user at extension 356. As noted above, extension 356 is not located at the node having the dial plan '3XX', which is node C, but is located at the node having the dial plan '5XX', which is node D.

As shown at step 1, the user at extension 201 initially dials the three digit number 356 into its PBX exchange. As pointed out above, when a call is sourced from a local extension, the respective switchboard node to which it is connected examines its list of known accounts, namely, the extensions of all the accounts that are assigned to that switchboard node. In the present example, therefore, node A examines its listed accounts (most of which can be expected to be extensions for the dial plan '2XX'), but fails to find extension 356 listed as a local extension, so that a message that extension 356 is not local is returned at step 2.

Failing to find the requested extension, node A knows that the extension, if it is part of the cooperative network, is located at another node, but it does not know which one. Therefore, at step 3, it sends a query message ("who knows 356?") to the internode communication network 50, which is broadcast at step 4 to all the other nodes in the network. Typically, it would be expected that extension 356 would be located at node C, due the dial plan of '3XX', except that in the present example, extension 356 has moved to node D, as pointed out above.

In response to the ("who knows 356?") query message, each node examines its local accounts for the identified extension. If a node does not have the requested extension, the message is ignored. In the present example, since extension 356 is located at node D, each of nodes B and C will ignore the message. However, if the node is connected to the requested extension, then that node replies to the requesting node that it has the queried target. In the present example, therefore, at step 5, node D transmits a reply message through the internode communication network 50 to the inquiring node A, that node D has the extension 356. Next, at step 6, node A sends a message to node D indicating it has a call for extension 356. Node D examines its dial plan listing and recognizes that it has extension 356. At step 7, node D delivers the call from the sourcing extension 201 at node A to its local called extension 356 and the call connection is complete.

A particular advantage of the methodology of the present invention is the fact that it does not require each node to have a copy of the dialing plans for all other nodes. Each node need only have a copy of the dialing plan for itself. This means that each node will have up-to-date information as to what it requires and whatever is required by other nodes, but does not have to concern itself with the accounts of other nodes. As a result each node will not possess possible out-of-date information.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of operating a multinode cooperative telecommunication network, wherein said telecommunication network comprising a limited access multinode communications network and a plurality of nodes coupled to one another by said multinode communication path, each node comprises a private branch exchange (PBX) platform operating as a switchboard and each having a separate dialing plan, wherein each node has a copy of the dialing plan only for its node as a (PBX) platform and no other nodes and being operative to service multiple communication devices coupled thereto through the respective separate dialing plan for a node wherein each of the nodes communicates with each other using a communications line without any separate signaling connection, each communication device having an extension within a respective dialing plan for a node that is used in the course of routing a call from a calling communication device to a called communication device as a queried target corresponding to a requested extension, said method comprising the steps of:
(a) in response to the placement of a call from a communication device coupled to a first node, causing said first node to examine the associated dialing plan associated with that respective node to determine whether said first node is coupled to said called device;
(b) at each node, examining the local accounts to determine if the queried target as the requested extension is connected to the respective node;
(c) in response to said first node determining that said first node is not coupled to said called device, transmitting a query message from said first node to all other nodes of said network, said query message being operative to inquire whether a respective node receiving said query message is coupled to said called device as a queried target;
(d) at a second node to which said called device is coupled, transmitting a reply message to said first node indicating that said second node is coupled to said called device and has the queried target corresponding to the requested extension while other nodes ignore the query message and do not transmit a reply•message indicative the all other nodes do not have the queried target as the requested extension for locating or routing; and
(e) in response to receipt of said reply message by said first node, routing said call from said first node to said second node, so that said second node may complete the connection of said call to said called device without requiring a copy of dialing plans for all other nodes.

2. A method of operating a multinode, cooperative, restricted access telecommunication network, wherein said telecommunication network comprising a limited access multinode communication network and a plurality of nodes coupled to one another by said internode communication network, wherein, each node comprises a private branch exchange (PBX) platform operating as a switchboard and each having a separate dialing plan wherein each of the nodes communicate with each other using a communications line without any separate signaling connection, wherein each node has a copy of the dialing plan only for its node as a (PBX) platform and no other nodes and being operative to service multiple communications devices coupled thereto through the respective separate dialing plan for the respective node, each communication device having an extension within a respective dialing plan for the respective node to which it is connected that is used in the course of routing a call from a calling communication device to a called communication device as a queried target corresponding to a requested extension, said method comprising the steps of:

(a) storing at each node the dialing plan that contains only communication device extensions that are coupled to said each respective node;

(b) in response to the placement of a call from a communication device coupled to a first node, causing said first node to examine the associated dialing plan associated with that respective node so as to determine whether said first node is coupled to said called device;

(c) in response to said first node determining that said first node is coupled to said called device, routing said call to said called device, but otherwise transmitting a query message from said first node to all other nodes of said network, said query message being operative to inquire whether a respective node receiving said query message is coupled to said called device as a queried target;

(d) at said all other nodes of said network examining respective call plans only therefor, so as to determine whether said called device is contained therein by examining at each node its local accounts to determine if the queried target is at the requested node;

(e) at only a second node which is that one of said all other nodes of said network to which said called device is coupled, transmitting a reply message to said first node indicating that said second node is coupled to said called device and has the queried target corresponding to the requested extension while all other nodes ignore the query message and do not transmit a reply message indicative the all other nodes do not have the queried target as the requested extension for locating or routing; and (f) in response to receipt of said reply message by said first node, routing said call from said first node to said second node, so that said second node may complete the connection of said call to said called device without requiring a copy of dialing plans for all other nodes.

* * * * *